US005546903A

United States Patent [19]

Satou et al.

[11] Patent Number: 5,546,903

[45] Date of Patent: Aug. 20, 1996

[54] THROTTLE VALVE CONTROL DEVICE OF INTERNAL COMBUSTION ENGINE

[75] Inventors: Eiichi Satou, Isehara; Masahiro Iriyama, Atsugi, both of Japan

[73] Assignee: Nissan Motor Co., Ltd., Kanagawa, Japan

[21] Appl. No.: 448,868

[22] Filed: May 24, 1995

[30] Foreign Application Priority Data

May 31, 1994 [JP] Japan .................................... 6-118738

[51] Int. Cl.[6] ............................... F02D 9/02; B60K 28/16

[52] U.S. Cl. ........................... 123/399; 123/361; 180/197

[58] Field of Search .................................... 123/352, 361, 123/396, 399; 180/178, 179, 197

[56] References Cited

U.S. PATENT DOCUMENTS

| | | | |
|---|---|---|---|
| 4,714,864 | 12/1987 | Yogo et al. | 123/361 X |
| 4,966,114 | 10/1990 | Basten | 123/396 |
| 5,141,070 | 8/1992 | Hickmann et al. | 123/396 X |
| 5,168,951 | 12/1992 | Sugiura et al. | 123/361 X |
| 5,452,697 | 9/1995 | Sasaki et al. | 123/361 X |

FOREIGN PATENT DOCUMENTS 3-61654 3/1991 Japan .

*Primary Examiner*—Tony M. Argenbright
*Attorney, Agent, or Firm*—Lowe, Price, LeBlanc & Becker

[57] ABSTRACT

A throttle valve control device having a traction control system includes a first control system which controls a throttle valve in accordance with movement of an accelerator pedal, a second control system which, upon a traction control of the vehicle, enforcedly pivots, with an aid of an electric motor, the throttle valve in a direction to reduce its open degree. An accelerator position sensor issues a first signal which represents the operation position of the first control system and an actuator position sensor issues a second signal which represents the operation position of the electric motor. A first device derives a first open degree of the throttle valve from the first signal and a second device derives a second open degree of the throttle valve from the second signal. A third device selects the smaller of the first and second open degrees of the throttle valve. The second control system is operated in accordance with both the second signal and the selected smaller open degree of the throttle valve.

12 Claims, 7 Drawing Sheets

THROTTLE VALVE CONTROL DEVICE OF INTERNAL COMBUSTION ENGINE

BACKGROUND OF THE INVENTION

1. Field of the Invention

The present invention relates in general to throttle valve control devices of an internal combustion engine, and more particularly to the throttle valve control devices of a type which has, besides a known system for directly controlling the throttle valve through the accelerator pedal, a so-called "traction control system" which, under a given condition, reduces the open degree of the throttle valve with an aid of an actuator irrespective of operation of the accelerator pedal.

2. Description of the Prior Art

Hitherto, in motor vehicles powered by an internal combustion engine, various throttle valve control devices with a traction control system have been proposed and put into a practical use, which can control the driving torque of the engine in accordance with the driving force actually needed by the vehicle under running. Such control devices are very useful in safely controlling the vehicle which is under running on a slippery surface, such as, an iced road, a snow-covered road or the like.

Some of such throttle valve control devices are of a type which has, in addition to a first throttle valve directly controlled by an accelerator pedal, a second throttle valve connected in series with the first throttle valve. That is, when a slip of road wheels of the vehicle is sensed, the open degree of the second throttle valve is reduced by a certain degree to lower the driving torque produced by the engine. With this, the driving force fed to the driving road wheels of the vehicle is reduced and thus undesired swerving phenomenon of the vehicle can be suppressed or at least minimized. The slip of road wheels is detected by, for example, comparing the rotation speed of the driving road wheel and that of a non-driving road wheel.

However, due to provision of the second throttle valve, the entire construction of the throttle valve control device becomes large in size.

In order to solve such drawback in size, Japanese Patent First Provisional Publication 3-61654 has proposed another throttle valve control device which employs only one throttle valve. That is, under normal running of the vehicle, the throttle valve is directly controlled by the accelerator pedal. While, when sensing the need of the traction control, the throttle valve is pivoted to reduce its open degree irrespective of operation of the accelerator pedal. In this control device, a butterfly-type throttle valve is employed which is mounted on a spring-biased throttle shaft to pivot therewith. By the spring, the throttle valve is biased in a direction to close the associated throat. An operation lever remotely actuated by the accelerator pedal is pivotally connected to the throttle shaft, and a control lever actuated by an electronically controlled actuator is also connected to the throttle shaft. A so-called "lost motion lever" is further connected to the throttle shaft, which becomes engaged with the operation lever upon pivoting of the operation lever in the valve closing direction. A lost motion spring is arranged between the operation lever and the lost motion lever to bias them in directions to establish engagement therebetween. An accelerator position sensor detecting the angular position of the operation lever and a throttle valve position sensor detecting the angular position of the throttle shaft are further employed for carrying out the traction control operation.

However, even this throttle valve control device has failed to exhibit a satisfied performance due to its inherent construction.

SUMMARY OF THE INVENTION

It is therefore an object of the present invention to provide a throttle valve control device which brings about an improved traction control with a reduced number of sensors.

According to the present invention, there is provided a throttle valve control device having a traction control system, which can control the throttle valve optimally in accordance with the driving force actually needed by the vehicle under running.

According to the present invention, there is provided a throttle valve control device of an internal combustion engine for use in a motor vehicle. The throttle valve control device comprises a first control system which controls a throttle valve in accordance with movement of an accelerator pedal; a second control system which, upon a traction control of the vehicle, enforcedly pivots, with an aid of an electric actuator, the throttle valve in a direction to reduce the open degree thereof irrespective of operation of the first control system; an accelerator position sensor for issuing a first signal which represents the operation position of the first control system; an actuator position sensor for issuing a second signal which represents the operation position of the electric actuator; first means for deriving a first open degree of the throttle valve from the first signal; second means for deriving a second open degree of the throttle valve from the second signal; and third means for selecting a smaller one from the first and second open degrees of the throttle valve, wherein the second control system is operated in accordance with both the second signal and the selected smaller open degree of the throttle valve.

DETAILED DESCRIPTION OF THE INVENTION

Figure 1:
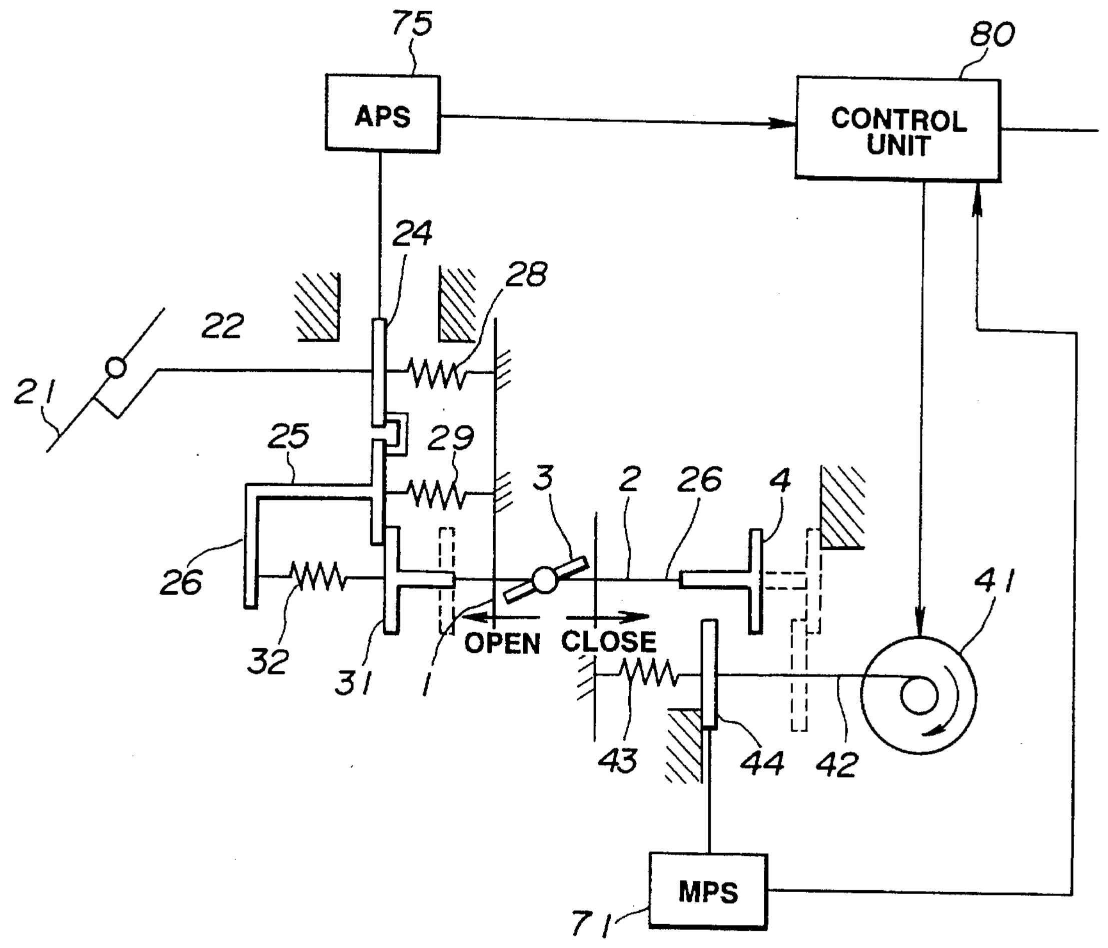
FIG. 1 is a functional diagram of a throttle valve control device according to the present invention.

Referring to FIG. 1 of the accompanying drawings, there is shown a functional diagram of a throttle valve control device according to the present invention. The following description will be well understood when taken in conjunction with FIGS. 6 and 7.

Designated by numeral 1 in FIG. 1 is a throttle body which rotatably supports a throttle valve 3. The throttle valve 3 is connected to a rotation shaft 2 to rotate therewith. An accelerator drum shaft 22 is supported by the throttle body 1, which has an axis extending in parallel with the rotation shaft 2. About the accelerator drum shaft 22, there is rotatably disposed an accelerator drum 24 which rotates or pivots in response to operation of an accelerator pedal 21. The accelerator drum 24 has an accelerator lever 25 integrally connected thereto. The accelerator lever 25 has an engaging lever 26 integrally connected thereto. Due to provision of respective biasing springs 28 and 29, the accelerator drum 24 and the accelerator lever 25 are biased in a direction to close the throttle valve 3, that is, in a direction opposite to the direction in which they are rotated when the accelerator pedal 21 is depressed.

A DC servo motor 41 is mounted to the throttle body 1 near an end 2*b* of the rotation shaft 2. The motor 41 has a drive shaft 42 which is in parallel with the rotation shaft 2. A speed reduction gear mechanism 44 is used for transmitting the movement of the drive shaft 42 of the motor 41 to the rotation shaft 2 while reducing the speed. Due to provision of a first spring 43 which produces a first given biasing force, the gear mechanism 44 is biased in a direction to open the throttle valve 3.

When moved in a given direction, that is, rightward in FIG. 1, the gear mechanism 44 is brought into abutment with an engaging lever 4 fixed to the end 2*b* of the rotation shaft 2. With this abutment, the rotation shaft 2 is rotated in only the direction to close the throttle valve 3. When the motor 41 is not energized, the gear mechanism 44 is forced to take a full-open position of the motor 41 due to the first given biasing force of the first spring 43.

Near the other end 2*a* of the rotation shaft 2, there is arranged a lost-motion lever 31. A lost-motion spring 32 extends between the engaging lever 26 and the lost-motion lever 31. Under normal conditions, the lost-motion lever 31 is in abutment with the accelerator lever 25 due to the force of the lost-motion spring 32. While, when the rotation shaft 2 is rotated in a direction to close the throttle valve 3, the lost-motion lever 31 is rotated independently of the accelerator lever 25 thereby to cancel the abutment with the accelerator lever 25.

That is, when, due to depression of the accelerator pedal 21, the accelerator drum 24 is rotated in a direction to open the throttle valve 3, the lost-motion lever 31 is rotated together with the accelerator lever 25 in a direction to open the throttle valve 3. This is because under such condition, the lost-motion lever 31 is kept biased to abut against the accelerator lever 25 due to the force of the lost-motion spring 32.

While, when, with the accelerator drum 24 kept in a given angular position, the motor 41 is rotated in a direction to close the throttle valve 3, the rotation shaft 2 is rotated in a direction to close the throttle valve 3. With this, the lost-motion lever 31 is rotated in a direction to close the throttle valve 3, that is, rightward in FIG. 1, against the force of the lost-motion spring 32. This is because the speed reduction gear mechanism 44 is so arranged as to permit the rotation shaft 2 to rotate in only the direction to close the throttle valve 3. Thus, the engagement between the lost-motion lever 31 and the accelerator lever 25 becomes canceled leaving the accelerator drum 24 behind, and thus the rotation of the rotation shaft 2 induces the closing movement of the throttle valve 3.

Near the end 2*b* of the rotation shaft 2, there is arranged a motor position sensor 71 which detects the operation position (viz., angular position) of the motor 41. Near the other end 2*a* of the rotation shaft 2, there is arranged an accelerator position sensor 75 which detects the rotation degree of the accelerator drum 24, that is, the depression degree of the accelerator pedal 21.

Information signals from the sensors 71 and 75 are fed to a control unit 80 which controls the motor 41 for the traction control.

In the following, the traction control executed by the control unit 80 will be described with reference to the flowcharts of FIGS. 2 to 5.

Figure 2:
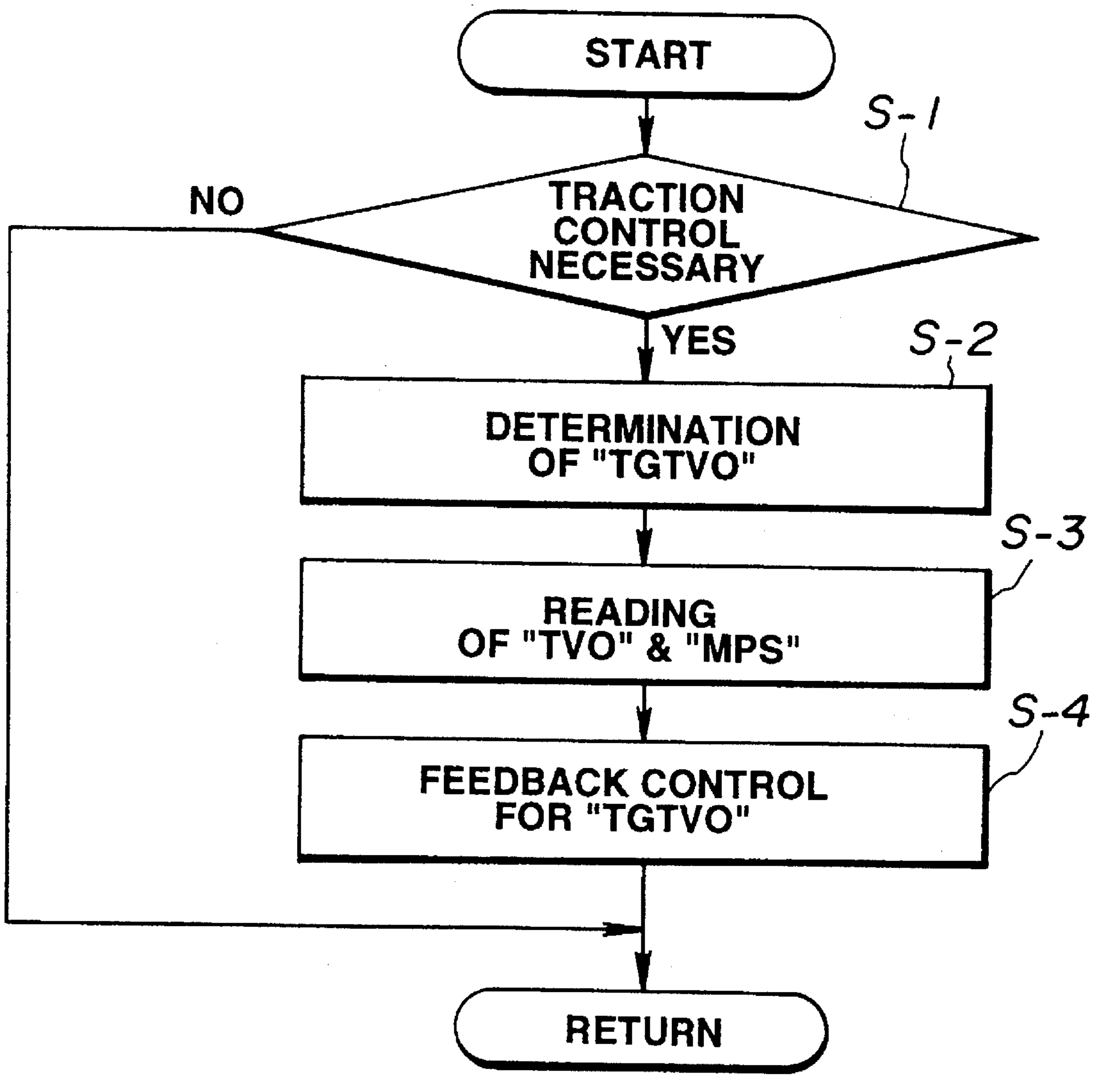
FIG. 2 is a flowchart showing operation steps which constitute a main routine for controlling a throttle valve of an internal combustion engine.

FIG. 2 shows operation steps which constitute a main routine. At step S-1, a judgement is carried out as to whether a traction control is necessary or not. The judgement may be based on information on a slip of driving road wheels. In fact, when, under movement of the vehicle, the driving road wheels are subjected to a certain slip, the traction control becomes necessary, which is the control for temporarily reducing the driving torque produced by the engine. If YES at step S-1, that is, when it is judged that the traction control is necessary, the operation flow goes to step S-2. At this step, a target open degree "TGTVO" of the throttle valve 3, appropriate for the need of the traction control, is determined. Then, at step S-3, an open degree "TVO" of the throttle valve 3 derived in an after-mentioned manner and a motor operation position "MPS" detected by the motor position sensor 71 are read. Then, at step S-4, based on the derived open degree "TVO" and the detected motor operation position "MPS", a feedback control is so made so that the throttle valve 3 is controlled to take the target open degree "TGTVO".

It is to be noted that even when the motor 41 and the throttle valve 3 are kept disconnected because, for example, the traction control is in its initial stage or the driver's foot is released from the accelerator pedal 21 under the traction control, the open degree "TVO" of the throttle valve 3 and the motor operation position "MPS" are known. Thus, it is possible to optimally control the motor 41 for the feedback control. That is, for example, until the connection between the motor 41 and the throttle valve 3 is established, the motor 41 can be rotated at a lower speed for obtaining a soft and smoothed connection of them, and after the connection, the motor 41 can be rotated at a desired higher speed for instantly pivoting the throttle valve 3 to take the target open degree "TGTVO". So-called "PID" (proportional, integral and derivative) control" may be used for controlling the motor 41. Thus, the feedback control can be made with a higher responsibility.

Figure 3:
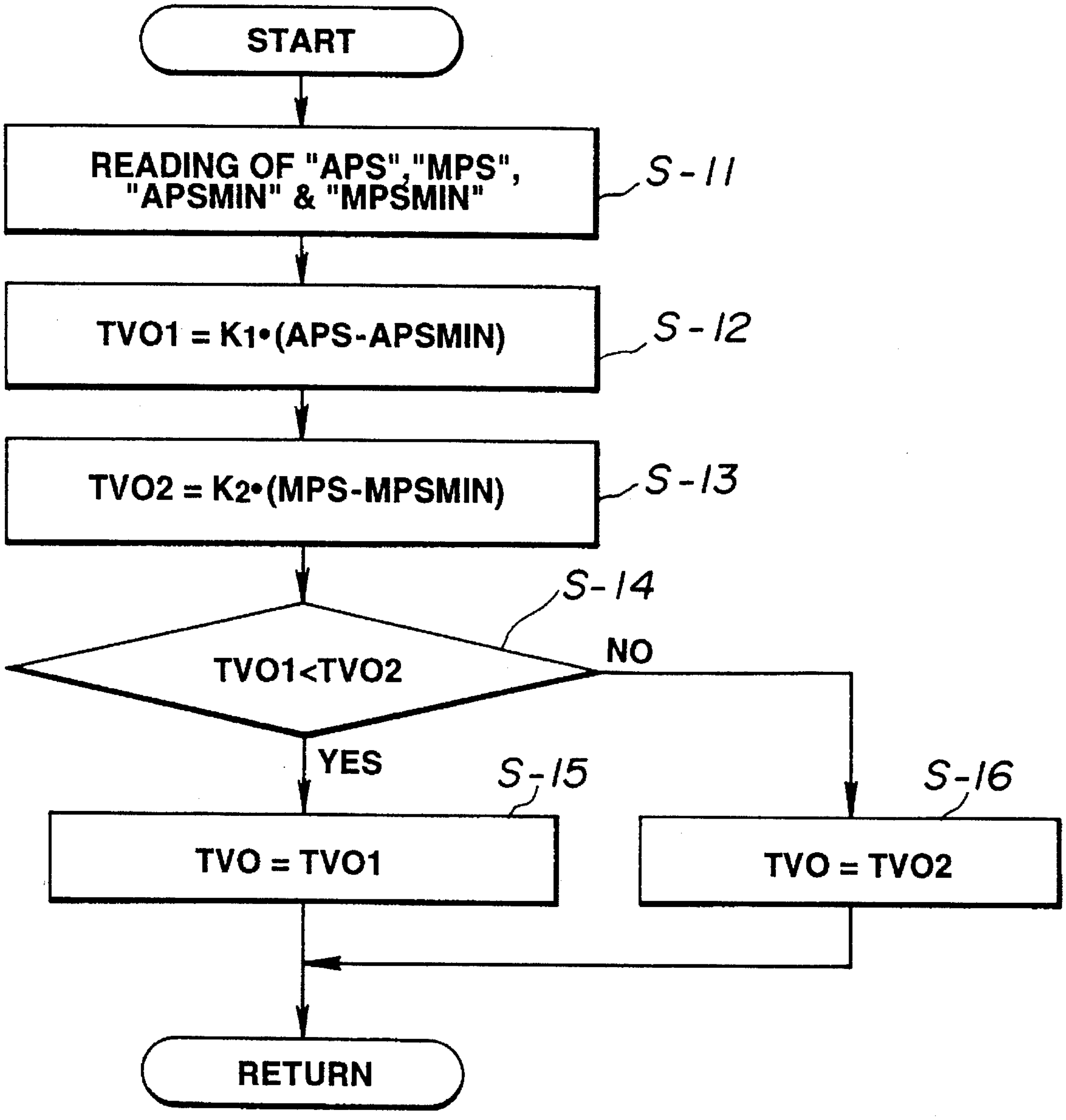
FIG. 3 is a flowchart showing operation steps which constitute a sub-routine for deriving the open degree of the throttle valve.

FIG. 3 is a flowchart showing operation steps which constitute a sub-routine for deriving the open degree "TVO" of the throttle valve 3.

At step S-11, an accelerator operation position "APS" detected by the accelerator position sensor 75, a motor operation position "MPS" detected by the motor position sensor 71, a learned accelerator operation position "APSMIN" corresponding to the full-closed position of the throttle valve 3 and a learned motor operation position "MPSMIN" corresponding to the full-closed position of the throttle valve 3 are all read.

The process for obtaining the learned positions "APSMIN" and "MPSMIN" will be described hereinafter.

In the following, for ease of description, the learned positions "APSMIN" and "MPSMIN" will be referred to "full-close corresponding accelerator position" and "full-close corresponding motor position" respectively.

At step S-12, a first throttle valve open degree "TVO1" corresponding to the accelerator operation position "APS" is calculated from the following equation:

$$TVO1=K_1\times(APS-APSMIN) \quad (1)$$

wherein:

$K_1$: Constant for converting an output (voltage) of the sensor 75 to a throttle valve open degree.

As is known, the accelerator position sensor 75 has a certain dispersion in output. The output dispersion becomes marked when it is used for a long time. That is, with increase in time for which the sensor 75 is practically used, the sensor 75 is liable to issue different outputs for the same sensed phenomena. Thus, in accordance with the invention, a learning technique is practically applied to the outputs of the accelerator position sensor 75 to provide the full-close corresponding accelerator position "APSMIN". Furthermore, in the invention, the first throttle valve open degree "TVO1" is derived based on a difference between the actually detected accelerator operation position "APS" and the learned position "APSMIN". With this technique, it becomes possible to obtain or derive a throttle valve open degree which is not affected by the output dispersion of the sensor 75.

At step S-13, a second throttle valve open degree "TVO2" corresponding to the motor operation position "MPS" is calculated from the following equation:

$$TVO2=K_2\times(MPS-MPSMIN) \quad (2)$$

wherein:

$K_2$: Constant for converting an output (voltage) of the sensor 71 to a throttle valve open degree.

That is, like in the step S-12, the learning technique is practically applied to the outputs of the sensor 71 to provide the full-close corresponding motor position "MPSMIN". Furthermore, the second throttle valve open degree "TVO2" is derived based on a difference between the actually detected motor operation position "MPS" and the learned position "MPSMIN".

At step S-14, a judgement is carried out as to whether or not the first throttle valve open degree "TVO1" is smaller than the second throttle valve open degree "TVO2".

If YES, that is, when "TVO1<TVO2" is established, the operation flow goes to step S-15 to make the throttle valve open degree "TVO" take the first open degree "TVO1". While, if NO at step S-14, that is, when "TVO1≧TVO2" is established, the operation flow goes to step S-16 to make the throttle valve open degree "TVO" take the second open degree "TVO2".

That is, when the traction control system is not actually operated, that is, when the motor 41 and the throttle valve 3 are kept disconnected, the throttle valve 3 is pivoted in response to movement of the accelerator pedal 21. Thus, under this condition, the first open degree "TVO1" shows a value corresponding to the actual open degree of the throttle valve 3, but the second open degree "TVO2" based on the motor operation position "MPS" shows a value greater than the actual open degree.

While, when the traction control system is actually operated, that is, when the motor 41 and the throttle valve 3 are operatively connected, the throttle valve 3 is pivoted in response to operation of the motor 41. Thus, under this condition, the second open degree "TVO2" shows a value corresponding to the actual open degree of the throttle valve 3, but the first open degree "TVO1" based on the accelerator operation position "APS" shows a value greater than the actual open degree by a degree corresponding to the enforced turning by the lost-motion spring 32.

Accordingly, when a smaller one is selected from the first and second open degrees "TVO1" and "TVO2", the actual throttle valve open degree "TVO" is automatically known or derived without making the detection as to whether the traction control is being carried out or not.

Figure 4:
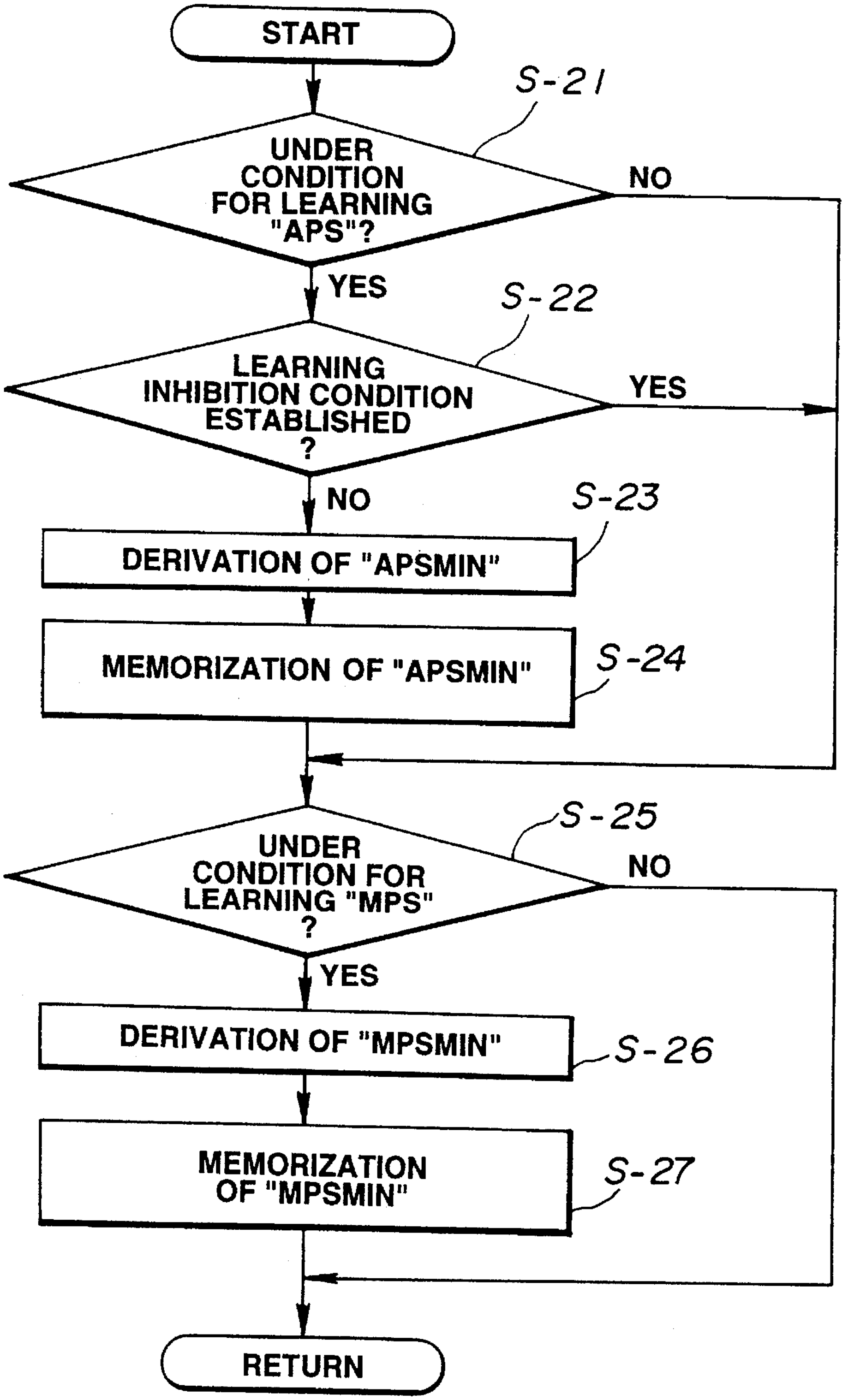
FIG. 4 is a flowchart showing operation steps which constitute a sub-routine for learning both an accelerator operation position which corresponds to the full-closed position of the throttle valve and a motor operation position which corresponds to the full-closed position of the throttle valve.

FIG. 4 is a flowchart showing operation steps which constitute a sub-routine for deriving the above-mentioned full-close corresponding accelerator position "APSMIN" and the full-close corresponding motor position "MPSMIN".

At step S-21, a judgement is carried out as to whether or not the existing condition of the motor vehicle should be used for learning the accelerator operation position corresponding to the full-closed position of the throttle valve 3. If YES, that is, when an ignition key cylinder has been just turned from OFF position to ON position or when the engine is in an idling condition keeping an idling switch ON, the operation flow goes to step S-22. If NO at step S-21, the operation flow goes to an after-mentioned step S-25.

At step S-22, a judgement is carried out as to whether an after-mentioned learning inhibition condition is established or not. If NO, that is, when it is judged that the learning inhibition condition is not established, the operation flow goes to step S-23. If YES at step S-22, the operation flow goes to the after-mentioned step S-25.

At step S-23, the learning of the accelerator position corresponding to the full-closed position of the throttle valve 3 is carried out. More specifically, the output of the accelerator position sensor 75 under the above-mentioned learning condition wherein the throttle valve 3 is fully closed is read. With this, the full-close corresponding accelerator position "APSMIN" is derived. If desired, a weighted mean of this just learned position "APSMIN" and a previously learned position may be used as a substitute for the learned position "APSMIN".

Then, at step S-24, the learned position "APSMIN" derived at step S-23 is stored in a RAM updating the content of the same.

Then, the operation flow goes to step S-25.

At this step, a judgement is carried out as to whether or not the existing condition of the motor vehicle should be used for learning the motor operation position corresponding to the full-closed position of the throttle valve 3. If YES, that is, when the engine is in an idling condition keeping the ignition switch ON and the transmission is in the neutral condition, the operation flow goes to step S-26. If NO at step S-25, the operation flow goes to RETURN.

At step S-26, the learning of the motor operation position corresponding to the full-closed position of the throttle valve 3 is carried out. More specifically, the motor 41 is operated until the throttle valve 3 comes to the fully closed position, and the output of the motor position sensor 71 under this full-closed condition of the throttle valve 3 is read. With this, the full-close corresponding motor position "MPSMIN" is derived.

Then, at step S-27, the learned position "MPSMIN" derived at step S-26 is stored in the RAM updating the content of the same.

Figure 5:
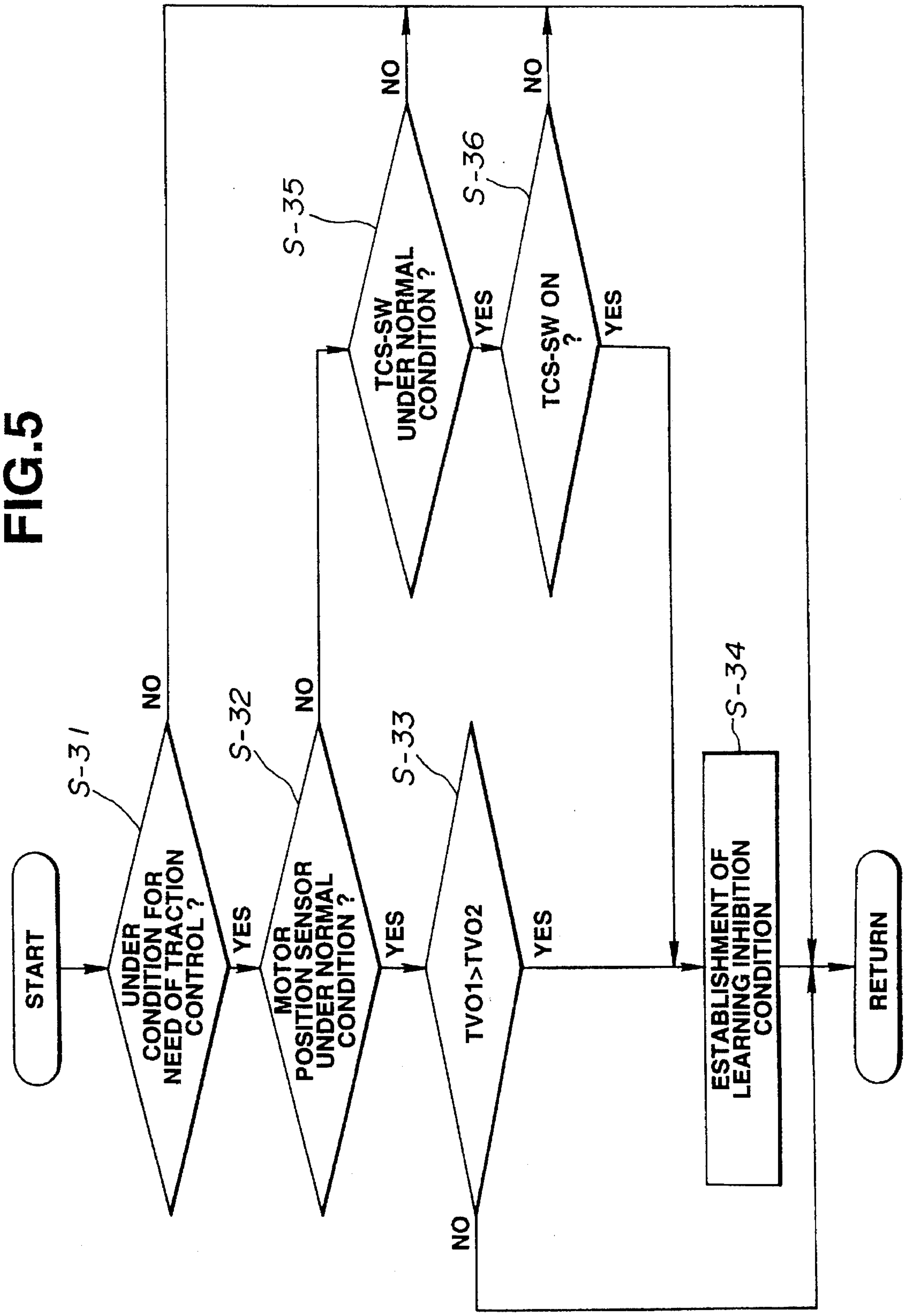
FIG. 5 is a flowchart showing operation steps which constitute a sub-routine for judging whether the learning of the accelerator operation position corresponding to the full-closed position of the throttle valve should be inhibited or not.

FIG. 5 is a flowchart showing operation steps which constitute a sub-routine for detecting the above-mentioned learning inhibition condition.

At step S-31, a judgement is carried out as to whether or not the motor vehicle is under a condition which needs the traction control. If YES, that is, when the vehicle is under the condition for need of the traction control, the operation flow goes to step S-32. While, if NO, the operation flow goes to RETURN.

At step S-32, a judgement is carried out as to whether the motor position sensor 71 operates normally or not. For this judgement, a so-called "self-diagnosable system" is used. If YES, that is, when the sensor 71 is judged to operate normally, the operation flow goes to step S-33.

At step S-33, a judgement is carried out as to whether or not the first throttle valve open degree "TVO1" is greater than the second throttle valve open degree "TVO2". This judgement is made for determining whether or not the traction control is being actually carried out operatively connecting the motor 41 with the throttle valve 3. If YES at step S-33, that is, when it is judged that the traction control is being carried out, the operation flow goes to step S-34.

At step S-34, the learning inhibition condition is established. This is made for inhibiting an erroneous derivation of the full-close corresponding accelerator position "APSMIN". That is, when the vehicle is under the traction control, and thus when the motor 41 is operatively connected with the throttle valve 3, it tends to occur that the throttle valve 3 is forced to take an extreme position beyond the normal full-closed position. If the learning of the full-close corresponding accelerator position "APSMIN" is carried out at such extreme position, accurately learned position "APSMIN" can not be derived.

If NO at step S-32, that is, when the motor position sensor 71 is judged to operate abnormally, the operation flow goes to step S-35.

At this step, a judgement is carried out as to whether or not a manual switch for operating the traction control system operates normally. If YES, that is, when the manual switch is judged to operate normally, the operation flow goes to step S-36. While, if NO, the operation flow goes to RETURN.

At step S-36, a judgement is carried out as to whether or not the manual switch for the traction control system takes ON condition. If YES, that is, when the manual switch is judged to take ON position, the operation flow goes to step S-34 for establishing the learning inhibition condition. That is, when the vehicle is under the traction control, it tends to occur that the throttle valve 3 is pivoted by the motor 41 to the extreme position beyond the normal full-closed position.

If NO at step S-33, that is, when "TVO1≦TVO2" is established, the operation flow goes to RETURN. That is, upon such establishment, it can be considered that even under the traction control, the throttle valve 3 is not pivoted to the above-mentioned extreme position.

As is seen from the above, if NO is issued at step S-33, S-35 or S-36, the learning inhibition condition is not established.

Figure 6:
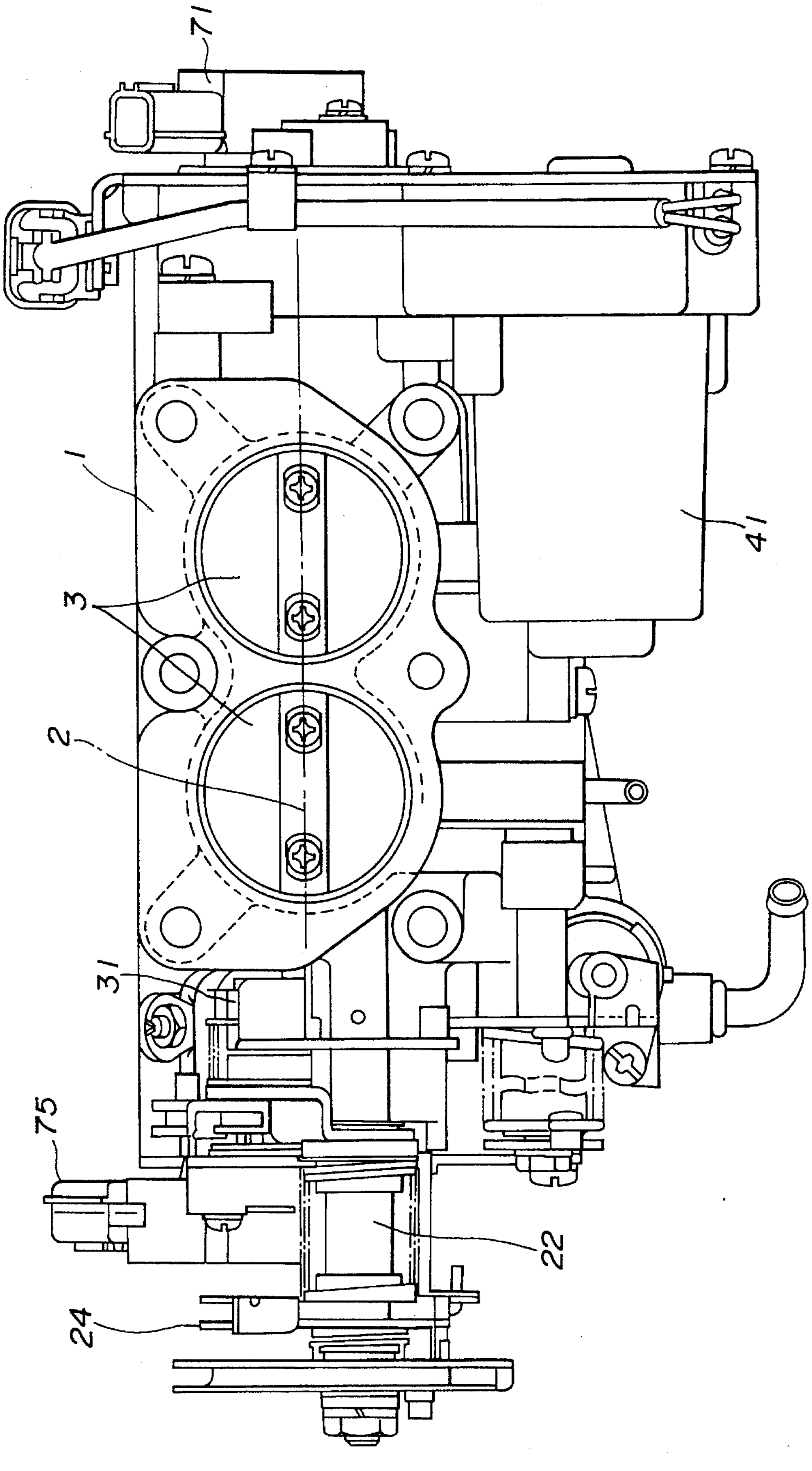
FIG. 6 is a plan view of a throttle structure to which the present invention is practically applied.
Figure 7:
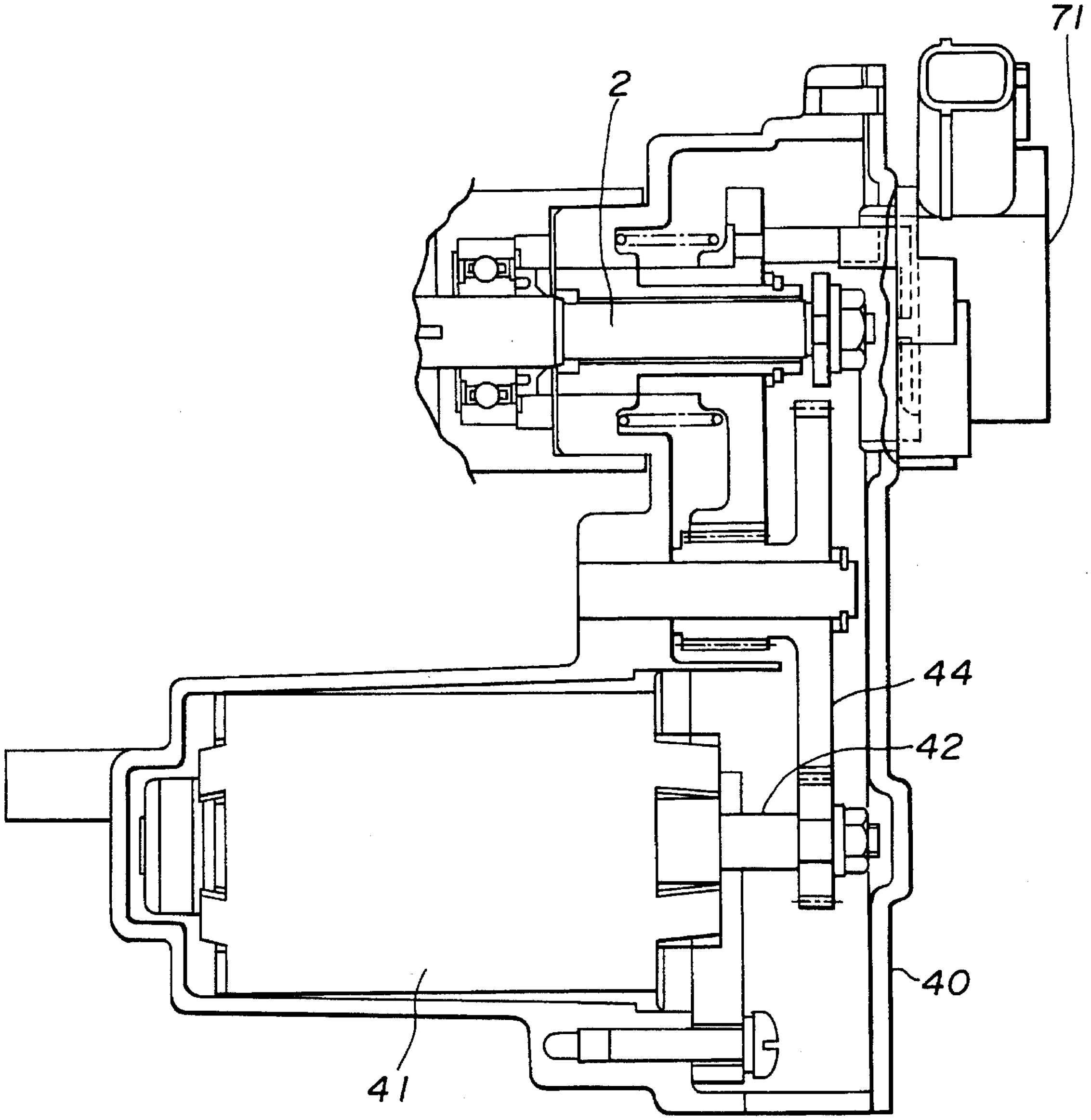
FIG. 7 is an enlarged sectional view of a right portion of the throttle structure where an electric motor and associated parts are arranged.

Referring to FIGS. 6 and 7, there is shown a throttle structure to which the present invention is practically applied.

In the drawings, denoted by numeral 3 is a twin type throttle valve including two valve plates. These valves plates are secured to the rotation shaft 2 to rotate therewith. As shown in FIG. 6, near one end of the rotation shaft 2, there are arranged the accelerator drum 24 and the accelerator position sensor 75, and near the other end of the rotation shaft 2, there are arranged the motor 41, the speed reduction gear mechanism 44 and the motor position sensor 71.

Due to the nature of the twin type throttle valve 3, the throttle structure can provide, at a position perpendicular to the axis of the rotation shaft 2, a sufficient space for accommodating the motor 41. Thus, the throttle structure can be assembled compact in size. As is seen from FIG. 7, the motor 41, the gear mechanism 44 and the motor position sensor 71, which constitute major parts of the traction control system, are assembled in a single case 40. The single case 40 is detachably connected to one side of the throttle body 1.

What is claimed is:

1. A throttle valve control device of an internal combustion engine for use in a motor vehicle, comprising:

a first control system which controls a throttle valve in accordance with movement of an accelerator pedal;

a second control system which, upon a traction control of the vehicle, enforcedly pivots, with an aid of an electric actuator, the throttle valve in a direction to reduce the open degree thereof irrespective of operation of said first control system;

an accelerator position sensor for issuing a first signal which represents the operation position of said first control system;

an actuator position sensor for issuing a second signal which represents the operation position of said electric actuator;

first means for deriving a first open degree of the throttle valve from said first signal;

second means for deriving a second open degree of the throttle valve from said second signal; and third means for selecting a smaller one from said first and second open degrees of the throttle valve, wherein said second control system is operated in accordance with both said second signal and the selected smaller open degree of the throttle valve.

2. A throttle valve control device as claimed in claim 1, in which said first means comprises:

fourth means for learning a throttle valve full-close corresponding accelerator position which is detected by said accelerator position sensor when said throttle valve takes its full-closed position; and fifth means for inhibiting said fourth means from making operation when said second control system is under operation.

3. A throttle valve control device as claimed in claim 1, in which said first open degree of the throttle valve, which is derived by said first means, is calculated based on both:

an existing operation position of said accelerator detected by said accelerator position sensor; and a first learned operation position of the accelerator which corresponds to the full-close position of the throttle valve, said first learned operation position being derived from said first signal when the throttle valve is fully closed.

4. A throttle valve control device as claimed in claim 3, in which said second open degree of the throttle valve, which is derived by said second means, is calculated based on both:

an existing operation position of said actuator detected by said actuator position sensor; and a second learned operation position of the actuator which corresponds to the full-close position of the throttle valve, said second learned operation position being derived from said second signal when the throttle valve is fully closed.

5. A throttle valve control device as claimed in claim 4, further comprising:

learning inhibition means which inhibits said first means from deriving said first learned operation position under a given condition of the vehicle.

6. A throttle valve control device as claimed in claim 5, in which said given condition of the vehicle is the condition wherein the vehicle is under traction control.

7. A throttle valve control device as claimed in claim 5, in which said given condition of the vehicle is the condition wherein the vehicle is under a condition which needs traction control, the actuator position sensor operates normally and said first open degree is greater than said second open degree.

8. A throttle valve control device as claimed in claim 5, in which said given condition of the vehicle is the condition wherein the vehicle is under a condition which needs traction control, the actuator position sensor operates abnormally, a manual switch for operating the traction control system operates normally and said manual switch assumes its ON position.

9. A throttle valve control device as claimed in claim 1, in which said first control system has a resilient member which is operatively interposed between said throttle valve and accelerator pedal.

10. A throttle valve control device as claimed in claim 9, in which when said electric actuator is energized, said second control system forces said throttle valve in the closing direction against a biasing force produced by said resilient member.

11. A throttle valve control device as claimed in claim 1, further comprising:

a rotation shaft to which said throttle valve is secured to rotate therewith, said rotation shaft having one end near which said first control system and accelerator position sensor are arranged and the other end near which said electric actuator and said actuator position sensor are arranged;

a drive shaft driven by said electric actuator; and a speed reduction gear mechanism which transmits the movement of the drive shaft to the throttle valve while reducing the speed.

12. A throttle valve control device as claimed in claim 11, in which said electric actuator, said speed reduction gear mechanism and said actuator position sensor are installed in a single case which is detachably mounted to a throttle structure which has the throttle valve installed therein.

* * * * *